US009005835B2

(12) United States Patent
Blanchet et al.

(10) Patent No.: US 9,005,835 B2
(45) Date of Patent: Apr. 14, 2015

(54) FUEL CELL WITH REDUCED MASS TRANSFER LIMITATIONS

(75) Inventors: Scott C. Blanchet, Chelmsford, MA (US); Amedeo Conti, Somerville, MA (US); James C. Cross, III, Carlisle, MA (US)

(73) Assignee: Nuvera Fuel Cells, Inc., Billerica, MA (US)

( * ) Notice: Subject to any disclaimer, the term of this patent is extended or adjusted under 35 U.S.C. 154(b) by 696 days.

(21) Appl. No.: 12/489,393

(22) Filed: Jun. 22, 2009

(65) Prior Publication Data

US 2010/0009233 A1     Jan. 14, 2010

Related U.S. Application Data

(60) Provisional application No. 61/074,805, filed on Jun. 23, 2008.

(51) Int. Cl.
| | | |
|---|---|---|
| *H01M 8/10* | (2006.01) | |
| *H01M 2/16* | (2006.01) | |
| *H01M 8/02* | (2006.01) | |

(52) U.S. Cl.
CPC ............ *H01M 8/026* (2013.01); *H01M 8/0206* (2013.01); *H01M 8/023* (2013.01); *H01M 8/0254* (2013.01); *H01M 8/1002* (2013.01); *Y02E 60/521* (2013.01)

(58) Field of Classification Search
CPC . H01M 8/0206; H01M 8/0208; H01M 8/023; H01M 8/0232; H01M 8/0254; H01M 8/026; H01M 8/0289; H01M 8/0297; H01M 2/14; H01M 2/16; H01M 2/164; H01M 2/1646; H01M 8/10; H01M 8/1016; H01M 8/1018; Y02E 60/521

USPC .......... 429/479–485, 512, 517, 520, 534, 429/452–454, 463, 469, 490–494, 518
See application file for complete search history.

(56) References Cited

U.S. PATENT DOCUMENTS

| | | | |
|---|---|---|---|
| 5,565,072 A | | 10/1996 | Faita et al. |
| 5,616,431 A | * | 4/1997 | Kusunoki et al. ............. 429/460 |
| 5,776,624 A | * | 7/1998 | Neutzler ........................ 429/437 |
| 6,080,503 A | * | 6/2000 | Schmid et al. ................ 429/483 |
| 6,887,613 B2 | * | 5/2005 | Lee et al. ...................... 429/522 |
| 7,087,337 B2 | * | 8/2006 | Trabold et al. ................ 429/508 |
| 7,104,545 B2 | * | 9/2006 | Williams et al. .............. 277/637 |
| 7,189,468 B2 | * | 3/2007 | Izenson et al. ................ 429/444 |

(Continued)

FOREIGN PATENT DOCUMENTS

| | | |
|---|---|---|
| JP | 2000-223137 | 8/2000 |
| JP | 2002-305005 | 10/2002 |
| JP | 2003-249242 | 9/2003 |
| JP | 2004-079245 | 3/2004 |
| JP | 2005-190710 | 7/2005 |
| JP | 2007-522642 | 8/2007 |
| JP | 2007-311089 | 11/2007 |
| JP | 2008-34281 | 12/2008 |
| WO | WO 2005/031900 | 4/2005 |
| WO | WO 2005/083815 A1 | 9/2005 |
| WO | WO 2007/088551 | 8/2007 |

OTHER PUBLICATIONS

International Search Report and Written Opinion issued from the European Patent Office in corresponding application PCT/US2009/003701, dated Aug. 21, 2009, 14 pages.
Japanese Office Action Dated Jul. 12, 2013, from JP Patent Application No. 2011-516279.
Japanese Office Action dated Sep. 2, 2014, from JP Patent Application No. 2011-516279.

*Primary Examiner* — Joseph Drodge
(74) *Attorney, Agent, or Firm* — Finnegan, Henderson, Farabow, Garrett & Dunner, L.L.P.

(57) ABSTRACT

This disclosure related to polymer electrolyte member fuel cells and components thereof.

23 Claims, 7 Drawing Sheets

(56) References Cited

U.S. PATENT DOCUMENTS

| | | |
|---|---|---|
| 7,803,476 B2 * | 9/2010 | Dadheech et al. ............ 429/483 |
| 8,101,319 B2 * | 1/2012 | Mikhail et al. ................ 429/512 |
| 8,450,023 B2 * | 5/2013 | Conti et al. ................... 429/452 |
| 2002/0182472 A1 | 12/2002 | Molter et al. |
| 2003/0162077 A1 | 8/2003 | Ohtani et al. |
| 2003/0162078 A1 | 8/2003 | Kikuchi et al. |
| 2005/0079400 A1 * | 4/2005 | Sugiura et al. ................. 429/35 |
| 2005/0158607 A1 * | 7/2005 | Vyas et al. ..................... 429/34 |
| 2005/0181264 A1 | 8/2005 | Gu et al. |
| 2005/0186459 A1 * | 8/2005 | Sugiura et al. ................. 429/26 |
| 2007/0065703 A1 * | 3/2007 | Abd Elhamid et al. ......... 429/34 |
| 2009/0075134 A1 * | 3/2009 | Tanaka et al. .................. 429/19 |
| 2010/0068579 A1 * | 3/2010 | Ainscough et al. ............ 429/25 |
| 2011/0195329 A1 * | 8/2011 | Fuss et al. ..................... 429/434 |

* cited by examiner

FUEL CELL WITH REDUCED MASS TRANSFER LIMITATIONS

CROSS REFERENCES TO RELATED APPLICATION

This application claims the benefit of U.S. Provisional Application No. 61/074,805, filed Jun. 23, 2008.

TECHNICAL FIELD

The present disclosure is directed to the field of polymer electrolyte membrane fuel cells.

BACKGROUND

A typical polymer electrolyte membrane ("PEM") fuel cell has a polymer membrane that serves as an electrolyte, supporting the conduction of protons according to its hydration level. The polymer membrane has two surfaces (or two sides). One surface is in contact with an anode electrode catalyst layer, while the other surface is in contact with a cathode electrode catalyst layer. The anode catalyst effectuates the dissociation of hydrogen into its constituent protons and electrons—the protons migrate through the membrane from its anode side to its cathode side, where they recombine with activated oxygen species to form water in the presence of the cathode catalyst.

SUMMARY

The disclosure provides a polymer electrolyte membrane fuel cell. The fuel cell comprises an electrochemical package comprising a cathode, an anode, and a polymer membrane interposed between the cathode and the anode. It further comprises a first and a second bipolar plate, an anode compartment disposed between the first bipolar plate and the anode of the electrochemical package, and a cathode compartment disposed between the second bipolar plate and the cathode of the electrochemical package. Furthermore, at least one of the first and the second bipolar plate is a formed metal sheet, and at least one of the anode and the cathode compartment comprises a porous spacer.

As disclosed herein, the formed metal sheet is a metal sheet that has a non-flat geometric shape. It may have ridges and grooves, a plurality of protrusions and indentations, a plurality of holes, or otherwise channels for fluid passages. The porous spacer is chosen from a perforated metal sheet, a metal foam, a graphite foam, an expanded metal mesh, and a metal wire mesh, or composite assemblage of such components Furthermore, a fuel cell disclosed herein may have the anode of its electrochemical package in contact with a formed metal sheet and the cathode of its electrochemical package in contact with a porous spacer. The fuel cell may also comprise a porous spacer interposed between the formed metal sheet and the anode.

In addition, a fuel cell disclosed herein may have the cathode of its electrochemical package in contact with a formed metal sheet and the anode of its electrochemical package in contact with a porous spacer. The fuel cell may also comprise a porous spacer interposed between the formed metal sheet and the cathode.

This disclosure also provides a fuel cell stack. The fuel cell stack comprises a plurality of electrochemical packages, each comprising an anode, a cathode, a polymer membrane interposed between the anode and cathode, as well as a plurality of bipolar plate assemblies, wherein the electrochemical packages and the bipolar plate assemblies are alternately placed so that an electrochemical package is interposed between two bipolar plate assemblies and a bipolar plate assembly is interposed between two electrochemical packages (or between an electrochemical package and an endplate assembly).

As used herein, a bipolar plate assembly, which is a combination of fuel cell components, comprises at least one bipolar plate and at least one other component attached or adjacent to the bipolar plate. In certain embodiments, the bipolar plate assembly comprises a flat bipolar plate with a formed metal sheet attached or adjacent to one side and a porous spacer attached or adjacent to the other side. In certain embodiments, the bipolar plate assembly may also comprise two formed metal sheets stacked together, forming a space between them that may serve as a cooling fluid passage.

This disclosure further provides a fuel cell, which comprises an electrochemical package comprising a cathode, an anode, and a polymer membrane interposed between the cathode and the anode; a first and a second bipolar plate; an anode compartment disposed between the first bipolar plate and the anode of the electrochemical package; and a cathode compartment disposed between the second bipolar plate and the cathode of the electrochemical package. The first and the second bipolar plates are each flat metal plates, and at least one of the anode compartment and the cathode compartment comprises a porous spacer.

In certain embodiments of this fuel cell, the anode compartment and the cathode compartment each comprises at least one porous spacer chosen from a perforated metal sheet, a metal foam, a graphite foam, an expanded metal mesh, and a metal wire mesh, or a composite assemblage of such components.

DETAILED DESCRIPTION

Figure 1A:
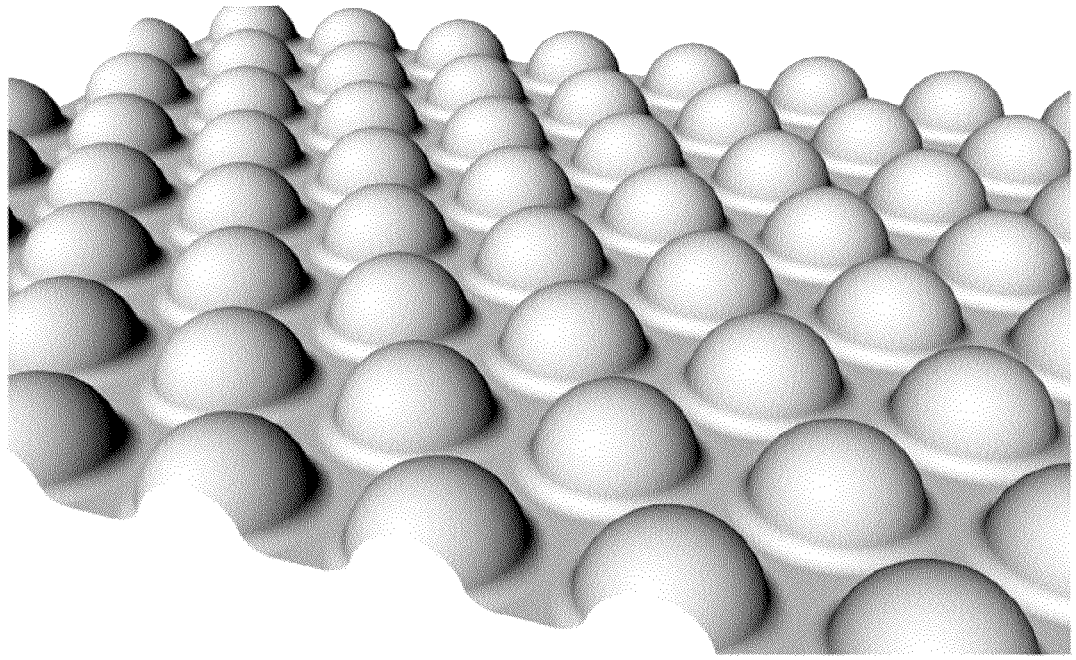
FIGS. 1A-1E are schematic illustrations of examples of the formed metal sheets in this disclosure.

As disclosed herein, a membrane electrode assembly ("MEA") refers to a polymer membrane that has an anode catalyst on one side and an cathode catalyst on the reverse side. A conducting media known as a gas diffusion layer ("GDL") can be attached or situated adjacent to either or both of the two sides of the MEA. The gas diffusion layer is made of carbon paper, graphite cloth, or other porous, flexible, and electrically conductive materials, or composite assemblages thereof.

In certain embodiments, the electrode catalyst can be applied directly on the surface of the polymer membrane. In additional embodiments, the electrode catalyst can incorporated into catalyst layer adjacent to the polymer membrane. Alternatively, the catalyst can be applied on a gas diffusion layer, which is then chemically attached, mechanically attached, or placed adjacent to the polymer membrane, with the catalyst interposed between the gas diffusion layer and the polymer membrane. In the former case, the gas diffusion layer is not required for the fuel cell to function. As disclosed herein, an electrochemical package ("ECP") refers to a component comprising a MEA with gas diffusion layers attached to both sides, or a MEA with only one gas diffusion layer attached to one side, or a MEA without a gas diffusion layer attached to it. Accordingly, the anode of an ECP refers to the side of the ECP that contains the anode catalyst and the cathode of an ECP refers to the side of the ECP that contains the cathode catalyst, with or without a gas diffusion layer attached to it. Therefore, when a fuel cell component is in direct contact with an electrode of the ECP, it can either be in direct contact with the catalyst, the catalyst layer, or in direct contact with the gas diffusion layer.

A fuel gas, e.g., a hydrogen-containing gas, is fed to the anode compartment, which is the space between the anode of the ECP and an electrically conductive (e.g. graphite or metal) gas barrier, i.e., a bipolar plate. An oxidant gas, e.g., an oxygen-containing gas such as air, is fed to the cathode compartment, which is the space between the cathode of the ECP and a bipolar plate. Spacers may be used to create fluid passages in the anode compartment and cathode compartment, respectively. The spacer can be made from a material that is electrically conductive and by design allows fluids to pass through.

In certain embodiments, a single fuel cell comprises an ECP, an anode compartment, a cathode compartment, two bipolar plates, and optionally one or more spacers. A "fuel cell stack" comprises multiple single fuel cells connected electrically in series, usually with a cooling cell interposed between the anode compartment of one fuel cell and the cathode compartment of another fuel cell. A cooling fluid, gaseous or liquid or multiphase, passes through the cooling cell, and exchanges heat with the adjacent anode and cathode compartments to afford control of the temperature therein. In addition or alternatively, a water-based liquid coolant can mix with the anode gas or the cathode gas inside the anode or cathode compartment to accomplish temperature control.

As used herein, a porous structure is a structure which consists of both structural material and accessible void space, where "structural material" means solid material and any inaccessible void space associated with it, where "accessible void space" means void space which is available to support the unrestricted flow of fluids through the porous structure, where the structure is "open" in the sense that any two points within the accessible void space of the structure can be connected by an imaginary smooth pathline residing entirely within the accessible void space of the structure, wherein the term "smooth" means that the pathline has a uniquely defined tangent vector at any point along it, wherein the phrase "support the unrestricted flow of fluids" means that for any aforementioned pathline a non-interference criterion is satisfied, meaning that for any point on the pathline, a circle (a) having said point as its center, (b) lying in a plane normal to the pathline tangent vector at said point, and (c) having a radius of 5 microns, does not intersect any solid material, and wherein the term "within" means inside the convex hull of the structure when it is assembled with other components in a fuel cell configuration.

Spacers based on porous structures so described are differentiated from spacers containing a plurality of discrete flow passages that are physically separated and distinct from one another. In certain embodiments, one or more spacers are placed in the anode and/or the cathode compartment of a fuel cell, electrically connecting the ECP and a bipolar plate. The spacers can be of either a porous structure or a non-porous structure.

One suitable porous spacer is a perforated metal sheet. A perforated metal sheet has arrays of perforations, e.g., round holes, hexagonal holes, square holes, slotted hole, etc. Before installation as a spacer in a fuel cell compartment, a perforated metal sheet may be processed to form a non-flat geometric shape. For example, it can be stamped to form undulating ridges and grooves, or indentations and protrusions, or other geometric shapes. An example of a perforated metal sheet that is commercially available can be obtained from McNichols Co., Tampa, Fla. When installed between a bipolar plate and an ECP, the perforated metal sheet allows passages of flow along its surfaces as well as through the perforations in the metal sheet.

Another suitable porous spacer is an expanded metal mesh. An expanded metal mesh is made from sheets of solid metal that are uniformly slit and stretched to create openings of certain geometric shapes, e.g., a diamond shape. In a standard expanded metal, each row of diamond-shaped openings is offset from the next, creating an uneven structure. The standard expanded metal sheet can be rolled to produce a flattened expanded metal.

A further suitable porous spacer is a metal wire mesh, which can be made by weaving or welding metal wires together, or simply bonding or placing perforated sheets or metal grids adjacent to one another. Both metal wire mesh and expanded metal mesh are commercially available, for example, from Mechanical Metals, Inc. of Newtown, Pa. When used as a spacer, the expanded metal mesh and the metal wire mesh may first be processed to form a non-flat geometric shape.

A piece of metal foam or graphite foam can also be used as a spacer. The foam has a reticulated structure with an interconnected network of ligaments. Because of this unique structure, the foam material in an uncompressed state can have a porosity that reaches at least 75%, such as, for example, greater than 80%, greater than 85%, greater than 90%, greater than 95%, and up to 98%. Metal foams are commercially available, for example, from Porvair Advanced Materials, Inc., Hendersonville, N.C. Graphite foams are also commercially available, for example, from Poco Graphite, Inc., Decatur, Tex.

When a spacer and an ECP are compressed together, the contacting area can be less than 75%, such as, for example, an area less than 50%, an area ranging from 1% to 35%, an area ranging from 2% to 25%, and an area ranging from 5% to 15% of the total geometric surface area of the ECP. Consequently, a large area of the ECP is exposed and readily accessible to the reactant in the cathode or the anode compartment. Accordingly, the mass transfer limitation for the reactant to reach the catalyst on the ECP is reduced. As a result, fuel cells comprising porous spacers may operate at high power densities, for example, at least 1.0 Watt/$cm^2$.

In another embodiment, a fuel cell may comprise a flat bipolar plate or a non-flat bipolar plate made of a formed metal sheet. As used herein, a formed metal sheet refers to a metal sheet that has a non-flat geometric shape. It may have a raised or embossed surface. It may be a corrugated metal sheet with undulating ridges and grooves. It may also have discontinuous indentations and protrusions.

A formed metal sheet may be made in a sheet metal forming process such as stamping. It may also form channels by removing part of the surface material, such as by etching and laser engraving, so that the thickness of the metal sheet varies. Enclosed channels may form between the raised surface of a formed metal sheet with an adjacent flat surface, such as an ECP. Consequently, a piece of formed metal sheet may serve as a bipolar plate that delimits a cathode or anode compartment as well as a spacer inside the cathode or the anode compartment in a fuel cell.

Figure 1B:
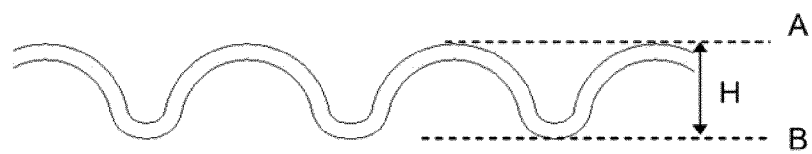

FIG. 1A shows an example of a formed metal sheet comprising arrays of protrusions that protrude from one side of the metal sheet, i.e., "single-sided protrusions." FIG. 1B shows a profile of the formed metal sheet of FIG. 1A on a cross section perpendicular to the metal sheet. In this embodiment, a protrusion on one side of the metal sheet corresponds to an indentation on the reverse side. Furthermore, there are areas near the bases of the protrusions that are substantially flat and are on substantially the same level plane. If the formed metal sheet is sandwiched between two flat plates, flow passages exist only between the side having protrusions and the adjacent flat plate. No flow channels exists on the reverse side, however, because the flat part of the surface is covered by the flat plate and indentations are not interconnected, forming no flow passage.

Figure 1C:
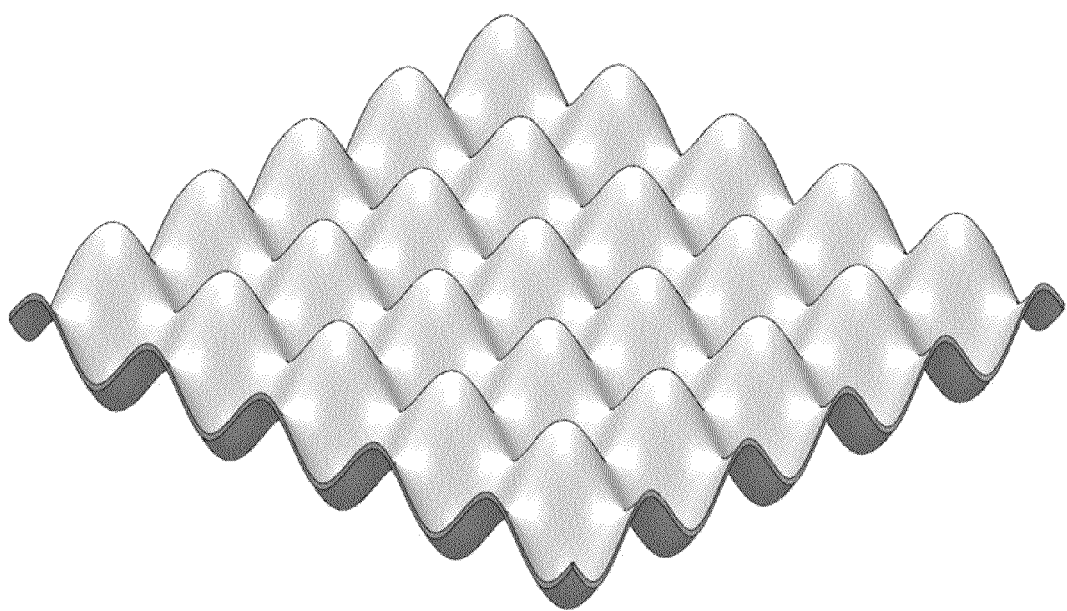
Figure 1D:
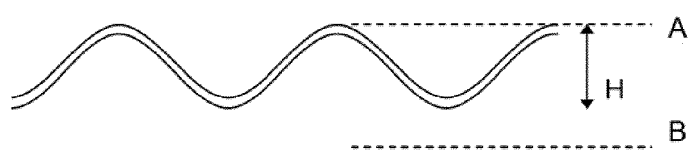

FIG. 1C shows an example of a formed metal sheet comprising protrusions on both sides of the metal sheet, i.e., "double-sided protrusions." In this example, there is no flat area between adjacent protrusions. FIG. 1D shows the profile of a formed metal sheet of FIG. 1C on a cross section perpendicular to the metal sheet. When such a formed metal sheet is sandwiched between two flat plates, protrusions come into contact with the flat plates on both sides of the metal sheet, forming flow passages on both sides of the formed metal sheet.

Figure 1E:
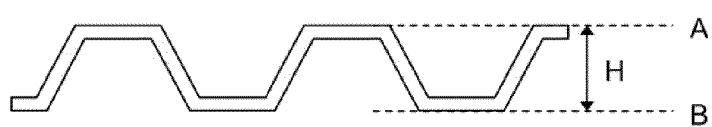

FIG. 1E shows another example of a formed metal sheet with double-sided protrusions, in which the protrusions are the shape of a frustum. As illustrated in FIGS. 1B, 1C, and 1E, the profile of the protrusions can be curvilinear (as in FIGS. 1B and 1D), or composed of straight line segments (FIG. 1E), or composed of both straight line segments and curves.

The height of the protrusions "H", defined as the shortest distance between two parallel imaginary planes (i.e., Plane A and Plane B in FIGS. 1B, 1D, and 1F) that sandwich the formed metal sheet, ranges from 0.05 to 5.0 mm, such as, for example, from 0.1 to 3.0 mm, from 0.2 to 2.0 mm, from 0.3 to 1.0 mm, and from 0.4 to 0.6 mm. The density of the protrusions ranges from 1 to 10,000 protrusions per square centimeter of the formed metal sheet, such as, for example, from 5 to 400 protrusions/cm$^2$, from 10 to 400 protrusions/cm$^2$, from 10 to 200 protrusions/cm$^2$, and from 20 to 200 protrusions/cm$^2$.

The arrangement of the protrusions can be 1) hexagonal, meaning one protrusion is surrounded by six neighboring protrusions that form a hexagon; 2) in a square pattern, meaning four neighboring protrusions can form a square; or 3) other geometric patterns and mixtures thereof.

The distribution of protrusions across the formed metal sheet can be uniform or varied. For example, selected areas of the formed metal sheet, e.g., near the inlet or outlet of a fluid, or around the center of the metal sheet, may have a higher density of protrusions than the rest of the formed metal sheet.

The size, height, and shape of the protrusions across the formed metal sheet can be uniform or varied. As used herein, the size of a protrusion is defined as the area of the surface having as its periphery the locus of infection points on the outermost solid surface of the protrusion. Protrusions may have a smaller size in an area where the density of the protrusions is high, or vice versa. In an assembled fuel cell, protrusions in a formed metal sheet may also have smaller sizes in an area in the vicinity of a reactant inlet or outlet when compared to protrusions in other areas of the formed metal sheet. In addition, a protrusion may have a different size than its neighboring protrusions. Protrusions may be elongated in the flow direction to reduce flow resistance, or across the flow direction to enhance mixing, and may be distributed in such a way as to preferentially enhance these effects. In certain embodiments, the area of the protrusions ranges from 0.000025 to 1.0 cm$^2$, such as, for example, from 0.0005 to 0.8 cm$^2$, from 0.0001 to 0.5 cm$^2$, and from 0.001 to 0.2 cm$^2$.

Figure 2A:
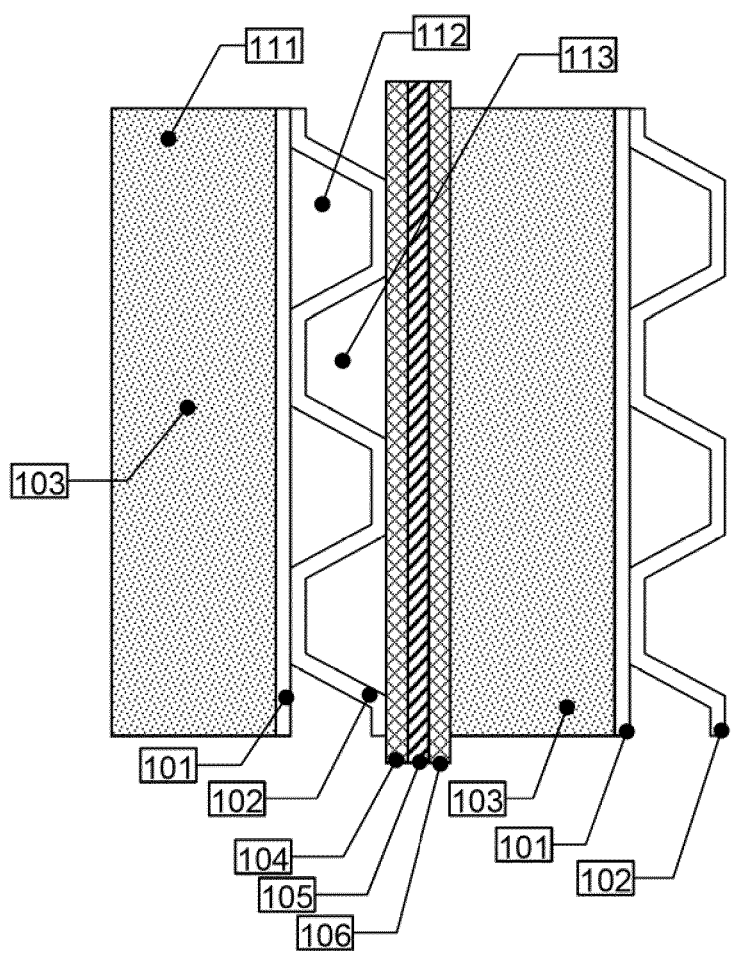
FIG. 2A-2D are schematic illustration of an embodiment of a fuel cell according to this disclosure and various contact patterns with the electrochemical package.

One of the embodiments in this disclosure is illustrated in FIG. 2A. The fuel cell comprises an ECP, which has a polymer membrane (105) and two gas diffusion layers (104, 106). The anode and cathode catalysts (not shown) reside between the polymer membrane and the gas diffusion layers (104) and (106) respectively. A formed metal sheet with double-sided protrusions (102) is placed between a flat bipolar plate (101) and the ECP. The space (113) between the formed metal sheet (102) and the ECP is the fluid passage for the fuel gas, i.e., the anode compartment. The space (112) between the formed metal sheet (102) and the bipolar plate (101) constitutes the passage for a cooling fluid, i.e., the cooling cell.

The spacer (103) in the cathode compartment can be a piece of porous material such as perforated metal sheet, metal or graphite foam, expanded metal mesh, or metal wire mesh. It electrically connects the cathode of the ECP and a bipolar plate (101).

One aspect of the embodiment according to FIG. 2A is that the anode compartment can be used as a cathode compartment, and vice versa, without changing the spacer or bipolar plates. This can be accomplished, for example, by reversing the ECP so that the cathode of the ECP delimits the space (113) and the anode of the ECP is put in contact with the spacer (103).

Figure 2B:
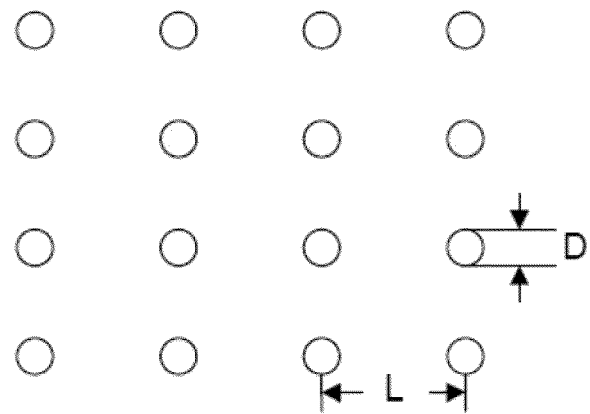

Another aspect of the embodiment according to FIG. 2A is that the pattern of the contact points between the formed metal sheet (102) and the ECP and the pattern of the contact points between the spacer (103) and the ECP are different. For example, FIG. 2B illustrates the contact pattern between the protrusions on the formed metal sheet and the ECP, which comprises arrays of dots. The dots have an average diameter "D" while the typical distance between two neighboring dots is "L." The size parameters "D" and "L" shall be defined similarly for the case in which the protrusions have varying sizes or are distributed nonuniformly.

Figure 2C:
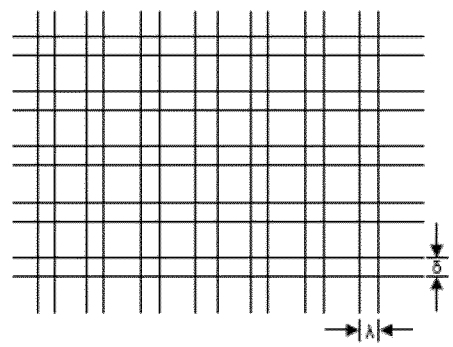
Figure 2D:
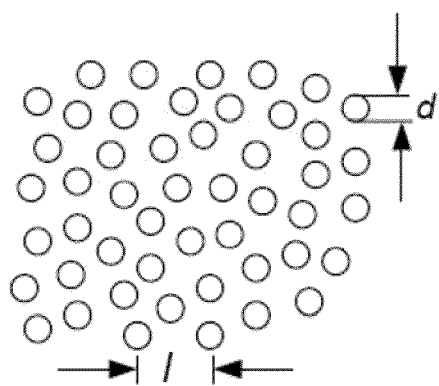

On the other hand, FIG. 2C illustrates the contact pattern between the ECP and a spacer, such as a metal mesh, which resembles a grid having vertical and horizontal lines. The average or representative width of the line is "δ" and the typical distance between two adjacent lines is "λ." FIG. 2D illustrates another possible contact pattern between the ECP and a spacer, such as a metal foam. In the contact pattern according to FIG. 2D, the contact points between the ECP and the metal foam have an average diameter "d" and an average distance of "l." Accordingly, the "L," "λ," and "l" are characteristic dimensions for the fluid passages near the surface of the ECP, while the "D,", "δ" and "d" are characteristic dimensions for the contact points with the ECP.

One aspect of the embodiments according to FIGS. 2A-2D is that the values of "L/λ" and "L/l" are larger than 1, such as, for example, ranging from 1 to 100, ranging or from 2 to 50, and ranging fromor from 35 to 30. In certain embodiments, the values of "D/δ" and "D/d" are also larger than 1, such as, for example, ranging from 1 to 2100, or ranging from 2 to 1050, or fromand ranging from 35 to 7530.

A further aspect of the embodiment of the fuel cell in FIG. 2A is that it can operate with a higher pressure in the compartment with the larger characteristic dimensions than that in the compartment with the lesser characteristic dimensions. The ECP is made of soft materials and may deform if a pressure differential exists between the anode and the cathode compartment. In this case, the pressure differential exerts a force on the ECP, pushing it against the spacer (103). Nevertheless, the spacer (103) is a porous material, i.e., a metal mesh or a metal foam, whose contacting points with the ECP are distributed across the whole surface of the ECP as shown in FIG. 2C and FIG. 2D. Consequently, the force on the ECP can be evenly absorbed by the spacer and the ECP tends not to deform. Even if deformation occurs, the reactant gas may still pass through the pores of the spacer and access the electrode of the ECP.

Figure 3:
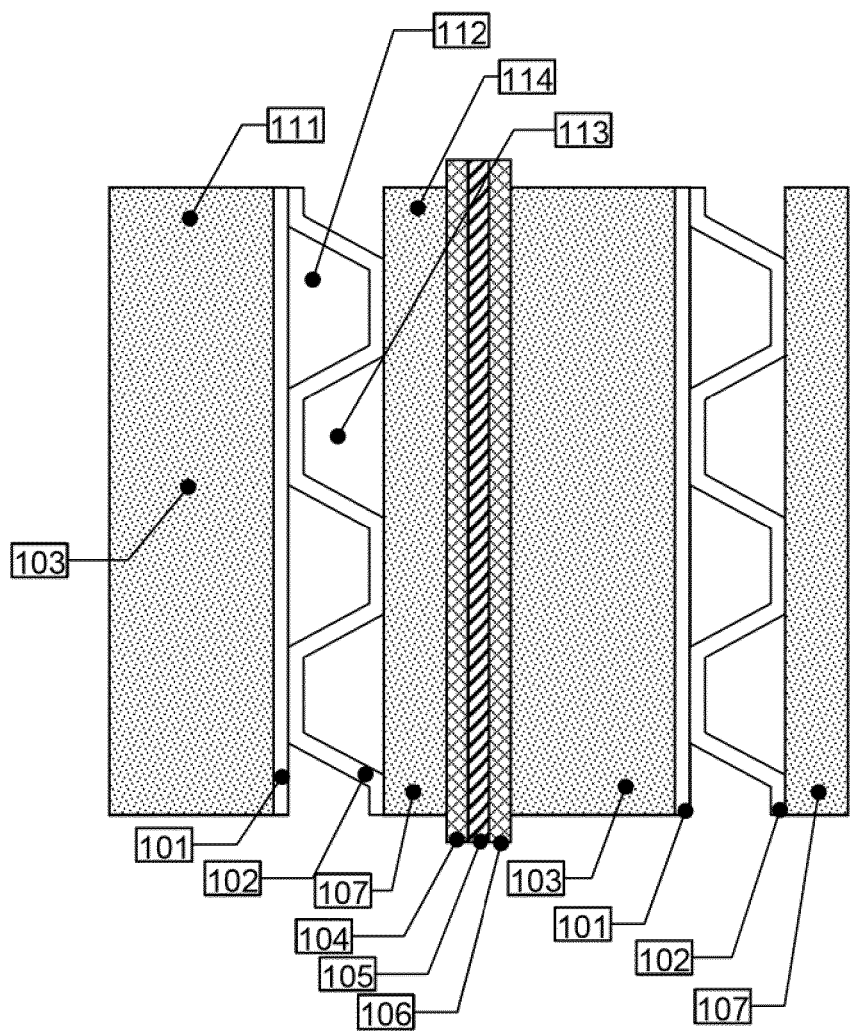
FIG. 3 is a schematic illustration of another embodiment of a fuel cell according to this disclosure.

Another embodiment in this disclosure is illustrated in FIG. 3. In a fuel cell according to this embodiment, a spacer (107) is interposed between the formed metal sheet (102) and the ECP in the anode compartment. The spacer (107) can be a piece of porous material, such as perforated metal sheet, metal or graphite foam, woven or weld metal wire mesh, or expanded metal mesh. In this embodiment, the formed metal sheet (102) is in contact with the spacer (107).

Figure 4:
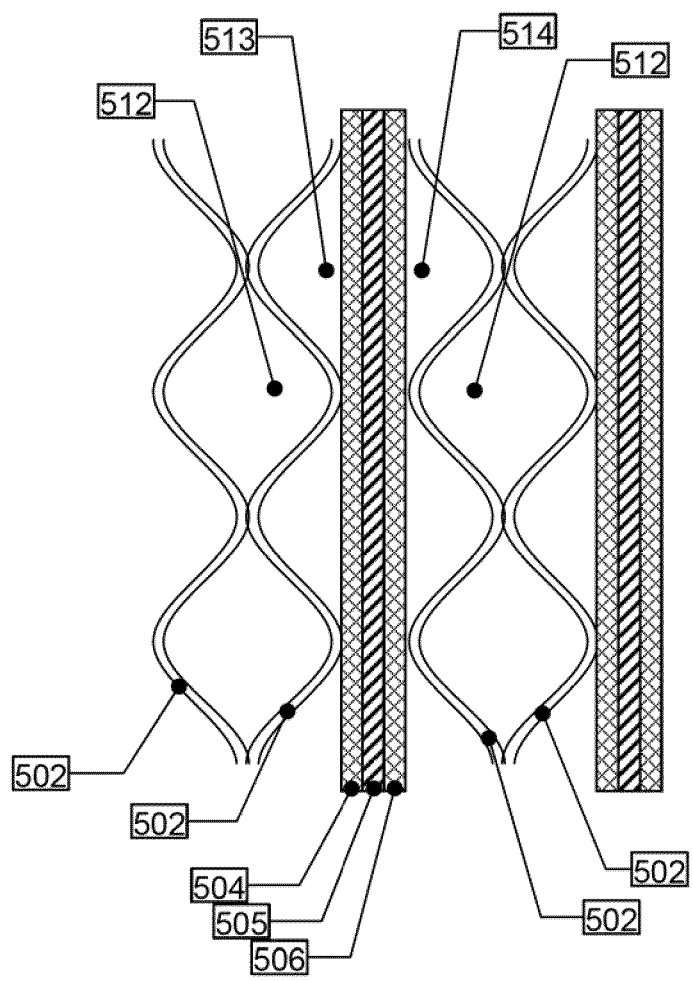
FIG. 4 is a schematic illustration of a further fuel cell embodiment according to this disclosure

A further embodiment in this disclosure is depicted in FIG. 4. A fuel cell according to this embodiment does not have a flat bipolar plate. Instead, two formed metal sheets (502) are stacked together, in which protrusions of the metal sheets are opposing but contacting each other. The space (512) between the two formed metal sheets (502) can serve as a cooling cell. The space between one side of the ECP and its adjacent formed metal sheet, e.g., (513) or (514), can be the flow passage for either the fuel gas (i.e., the anode compartment) or the cathode gas (i.e., the cathode compartment). Accordingly, a fuel cell stack comprising fuel cells of this embodiment can be constructed by alternately stacking one ECP and two formed metal sheets together. Furthermore, the two formed metal sheets can be bonded together as a bipolar plate assembly.

One aspect of the embodiment according to FIG. 4 is that protrusions in the adjacent formed metal sheet (502) may not be in alignment, provided that a space can be maintained between the two formed metal sheets in an assembled fuel cell.

In certain embodiments, the spaces (513) and (514) of FIG. 4 may further comprise one or more spacers of a porous body, such as a perforated metal sheet, a metal foam, a graphite foam, an expended metal mesh, and a metal wire mesh. In other embodiments is that the formed metal sheets (502) may not be identical in geometric shape, characteristic dimensions, or material of construction.

One aspect of the embodiments disclosed herein is that bipolar plates and spacers can be bonded together to form bipolar plate assemblies. For example, in the fuel cells in FIG. 2, the spacer (103), or the formed metal sheet (102), or both can be bonded to the flat bipolar plate (101). Likewise, in FIG. 3, two or more adjacent components among the spacer (103), the flat bipolar plate (101), the formed sheet (102), and the spacer (107) can be bonded together. A fuel cell stack can be built by alternately stacking an ECP and an bipolar plate assembly in a repetitive fashion.

The construction of the bipolar plate assembly can be accomplished by compression, by welding, by brazing, by adhesion, or by elastomeric sealing. The bonding between the adjacent components can also be accomplished using mechanical fastening means such as clamps, clips, or snaps. In doing so, the bonding can be released by removing the fastening means with little damage to the fuel cell components.

Figure 5:
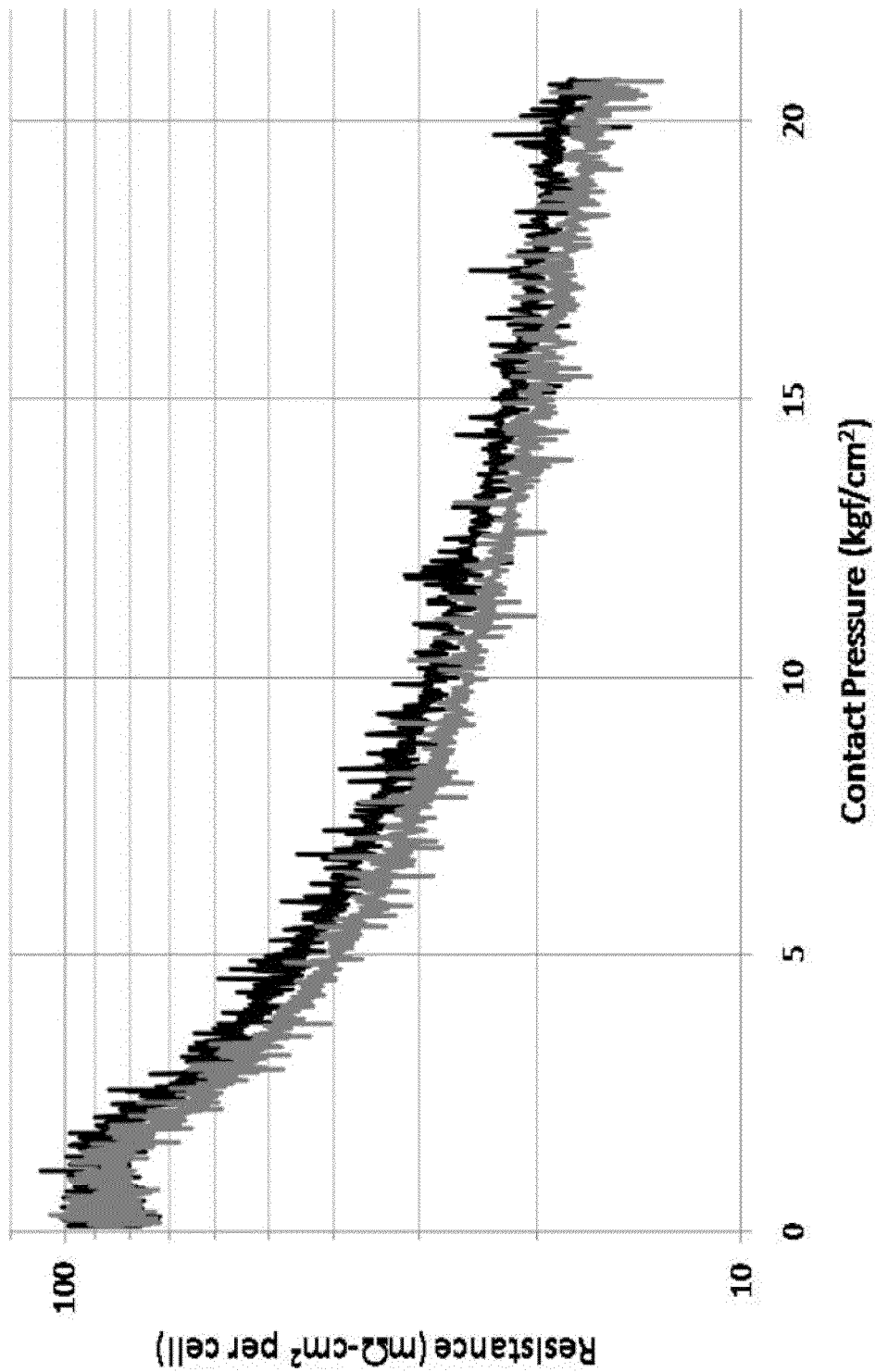
FIG. 5 is a data plot showing the contact resistance of a combination of certain fuel cell components when assembled.

FIG. 5 shows the contact resistance of a fuel cell stack disclosed herein. The fuel cell stack as in FIG. 2 was modified by removing the ECP (104, 105, and 106). The remaining assembly was then compressed and its contact resistance measured at various compression pressures. As shown in FIG. 5, the resistance of spacers in a fuel cell at the contact pressure of 22 kgf/cm$^2$ is about 18 mΩ/cm$^2$.

It will be apparent to those skilled in the art that various modifications and variations can be made without departing from the spirit of the invention. The present invention covers all such modifications and variations, provided they come within the scope of the claims and their equivalents.

We claim:

1. A polymer electrolyte membrane fuel cell, comprising:
   an electrochemical package comprising a cathode, an anode, and a polymer membrane interposed between the cathode and the anode;
   a first and a second bipolar plate;
   an anode compartment disposed between the first bipolar plate and the anode of the electrochemical package; and
   a cathode compartment disposed between the second bipolar plate and the cathode of the electrochemical package, wherein
   at least one of the first bipolar plate and the second bipolar plate is a bipolar plate assembly comprising:
      a flat bipolar plate with a porous spacer attached to one side and a formed metal sheet attached to the other side, or
      two formed metal sheets attached to each other wherein the formed metal sheets provide open flowfields between the bipolar plate assemblies and the electrochemical packages; wherein
         the formed metal sheet(s) is a corrugated metal sheet comprising ridges and grooves, or
         the formed metal sheet(s) comprises a plurality of protrusions,
   at least one of the anode compartment or the cathode compartment comprises an open flowfield,
   the electrochemical package is in direct contact with at least one of the bipolar plate assembly, the porous spacer, or one of the formed metal sheets, and
   to the extent present, the porous spacer(s) is chosen from a metal foam, a graphite foam, an expanded metal mesh, and a metal wire mesh.

2. The fuel cell of claim 1, wherein the first bipolar plate is a bipolar plate assembly, and the cathode compartment further comprises a porous spacer providing an open flowfield, wherein said porous spacer is chosen from a metal foam, a graphite foam, an expanded metal mesh, and a metal wire mesh.

3. The fuel cell of claim 2, wherein the first bipolar plate is in direct contact with the anode of the electrochemical package.

4. The fuel cell of claim 2, further comprising a porous spacer interposed between the first bipolar plate and the anode of the electrochemical package, wherein the porous spacer provides an open flowfield and is chosen from a metal foam, a graphite foam, an expanded metal mesh, and a metal wire mesh.

5. The fuel cell of claim 1, wherein the second bipolar plate is a bipolar plate assembly, and the anode compartment further comprises a porous spacer providing an open flowfield, wherein said porous spacer is chosen from a metal foam, a graphite foam, an expanded metal mesh, and a metal wire mesh.

6. The fuel cell of claim 5, wherein the second bipolar plate is in direct contact with the cathode of the electrochemical package.

7. The fuel cell of claim 5, further comprising a porous spacer interposed between the second bipolar plate and the cathode of the electrochemical package, wherein the porous spacer provides an open flowfield and is chosen from a metal foam, a graphite foam, an expanded metal mesh, and a metal wire mesh.

8. The fuel cell of claim 1, wherein the anode of the electrochemical package comprises an anode catalyst and a gas diffusion layer.

9. The fuel cell of claim 1, wherein the cathode of the electrochemical package comprises a cathode catalyst and a gas diffusion layer.

10. The fuel cell of claim 1, wherein at least one of the formed metal sheets comprises a plurality of protrusions and a profile of a protrusion on a cross section perpendicular to the planar direction of the at least one of the formed metal sheets is curvilinear, or is composed of straight line segments, or is composed of one or more curves and one or more straight line segments.

11. The fuel cell of claim 1, wherein at least one of the formed metal sheets comprises a plurality of protrusions and the height of the protrusion in the at least one of the formed metal sheets ranges from 0.1 - 3.0 mm.

12. The fuel cell of claim 1, wherein at least one of the formed metal sheets comprises a plurality of protrusions and a density of the protrusions in the at least one of the formed metal sheets ranges from 5 and 400 protrusions per square centimeter.

13. The fuel cell of claim 1, wherein at least one of the formed metal sheets comprises a plurality of protrusions and the density of the protrusions is uniform across the at least one of the formed metal sheets.

14. The fuel cell of claim 1, wherein at least one of the formed metal sheets comprises a plurality of protrusions and the density of the protrusions varies across the at least one of the formed metal sheets.

15. The fuel cell of claim 1, wherein, to the extent present, one or more of the formed metal sheets have a plurality of protrusions on one side of the metal sheet(s).

16. The fuel cell of claim 1, wherein, to the extent present, one or more of the formed metal sheets have a plurality of protrusions on both sides of the metal sheet(s).

17. A fuel cell stack, comprising:
a plurality of electrochemical packages, each comprising an anode, a cathode, and a polymer membrane interposed between the anode and the cathode;
a plurality of bipolar plate assemblies wherein the bipolar plate assemblies comprise:
a flat bipolar plate with a porous spacer attached to one side and a formed metal sheet attached to the other side, or
two formed metal sheets attached to each other wherein the formed metal sheets provide open flowfields between the bipolar plate assemblies and the electrochemical packages,
wherein
the formed metal sheet(s) is a corrugated metal sheet comprising ridges and grooves, or
the formed metal sheet(s) comprises a plurality of protrusions;
a plurality of anode compartments disposed between the bipolar plate assemblies and the anodes of the electrochemical packages; and
a plurality of cathode compartments disposed between the bipolar plate assemblies and the cathodes of the electrochemical packages,
wherein,
the electrochemical packages and the bipolar plate assemblies are alternately stacked against each other so that an electrochemical package is interposed between two bipolar plate assemblies to form a fuel cell, and
a bipolar plate assembly is interposed between two electrochemical packages, wherein,
the electrochemical packages are in direct contact with at least one of the bipolar plate assemblies, the porous spacer, or one of the formed metal sheets,
at least one of the anode compartment or the cathode compartment of the fuel cells comprises an open flowfield, and
if present, the porous spacer(s) provide an open flowfield.

18. The fuel cell stack of claim 17, wherein the bipolar plate assemblies comprise a flat bipolar plate with a porous spacer attached to one side and the formed metal sheet attached to the other side, the porous spacer provides an open flowfield and is chosen from a metal foam, a graphite foam, an expanded metal mesh, and a metal wire mesh.

19. The fuel cell stack of claim 17, wherein the bipolar plate assemblies are formed by welding, brazing, adhesion, and mechanical pressuring.

20. The fuel cell stack of claim 17, wherein the bipolar plate assemblies comprise two formed metal sheets attached to each other wherein the formed metal sheets provide open flowfields between the bipolar plate assemblies and the electrochemical packages.

21. A polymer electrolyte membrane fuel cell, comprising:
an electrochemical package comprising a cathode, an anode, and a polymer membrane interposed between the anode and the cathode; and
a bipolar plate assembly stacked against the electrochemical package providing an open flowfield therebetween, wherein the bipolar plate assembly comprises a flat bipolar plate with a porous spacer attached to one side and a formed metal sheet attached to the other side, wherein the formed metal sheet comprises ridges and grooves, protrusions and indentations, or channels,
wherein the electrochemical package is in direct contact with the bipolar plate assembly, the formed metal sheet, or the porous spacer, and
wherein, to the extent present, the porous spacer(s) is chosen from a metal foam, a graphite foam, an expanded metal mesh, and a metal wire mesh.

22. The fuel cell of claim 21, wherein the formed metal sheet of the bipolar plate assembly is in direct contact with the anode of the electrochemical package.

23. The fuel cell of claim 21, wherein the formed metal sheet of the bipolar plate assembly is in direct contact with the cathode of the electrochemical package.

* * * * *